Patented Nov. 29, 1927.

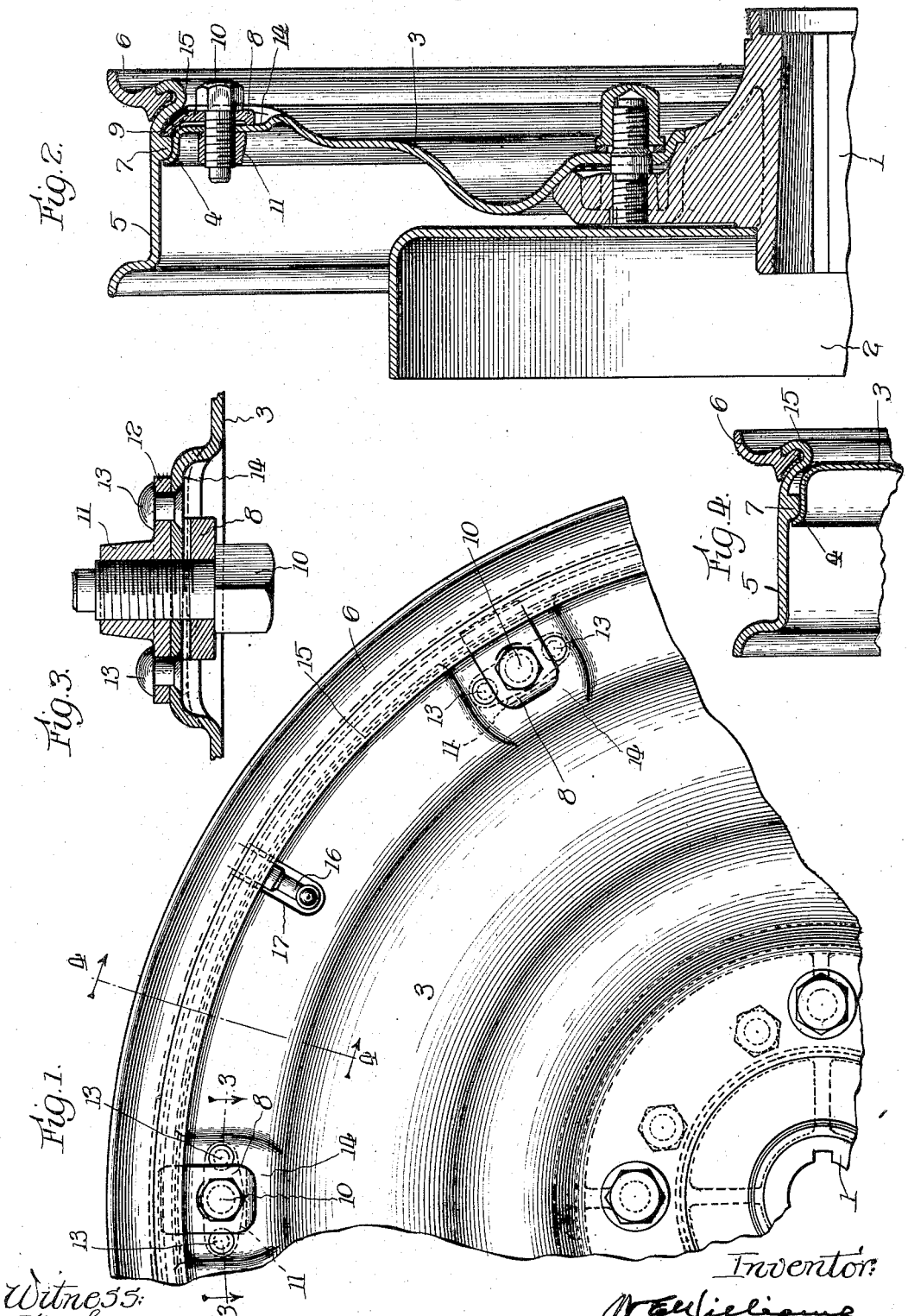

1,650,781

UNITED STATES PATENT OFFICE.

WILLIAM ERASTUS WILLIAMS, OF WILMETTE, ILLINOIS, ASSIGNOR, BY MESNE ASSIGNMENTS, TO STEEL WHEEL CORPORATION, OF LANSING, MICHIGAN, A CORPORATION OF MICHIGAN.

DEMOUNTABLE-RIM DISK WHEEL.

Application filed August 1, 1922. Serial No. 579,020.

My invention relates to that class of wheels where a demountable rim for pneumatic tires is made detachable from the web of the wheel, and the object of the invention is to produce a desirable form of demountable rim and a fastening therefor, on a disk wheel or other type of wheel adapted to receive this type of rim, and the invention is set forth in the claim. Reference will be had to the accompanying drawings, in which Figure 1 is a front elevation of a portion of a wheel.

Figure 2 is a side sectional elevation of a portion of a wheel.

Figure 3 is a transverse section on line 3—3 of Figure 1.

Figure 4 is a section on line 4—4 of Figure 1.

In the drawing 1 indicates the hub of an ordinary automobile wheel.

2 indicates the brake drum.

3 indicates a disk forming the web of a wheel.

4 indicates a flange turned on the margin of the disk, and this forms the bearing tread on the web of the wheel.

5 indicates a rim for pneumatic tires, of what is known as the Q. D. or quick detachable type, having a side ring 6.

The wheel disk has a lateral, peripheral, integral flange 4, and the main cylindrical body 5 of the rim is rolled with an internal bead 7, near its outer side, fitting the disk flange, which is marginally bent toward the rim and in lateral contact with the bead. Clamping clips 8 are removably secured to the disk by bolts 10 and fixed nuts 11, having lateral lugs 12 fixed to the disk by rivets 13.

The inner ends of the clips have projections which bear on the disk and their opposite ends have projecting portions which press, at 9, against the lateral face of the rib or bead when the bolts are screwed home.

At intervals where the clips 8 are secured to the disk, the disk is embossed or set inward for a short distance as is indicated by the inset portion 14. the purpose being to give clearance for the head of the screws to come underneath the gutter 15 of the rim.

The marginal flange 4 of the disk is wider between the clamping clips than the sections 14 where the same is embossed and this wider tread is shown by section in Figure 4.

By providing the rim with the bead 7, which forms a snug fit over the margin of the disk, I am able to make the lightest rim structure consistent with the other desirable features of a demountable rim disk wheel.

The air stem for a pneumatic tire is shown as an angle valve stem indicated by 16, and the disk is notched out at 17 to permit the entry of this valve stem.

What I claim is:—

In a device of the class described, a disk forming the web of the wheel and having a marginal tread flange turned thereon, a demountable rim having an internal bead adapted to seat on the tread flange of the said disk and said tread flange being narrower at certain intervals than at the main front felloe face portion of the disk.

Signed at Chicago in the county of Cook and State of Illinois, this 13th day of July, 1922.

WILLIAM ERASTUS WILLIAMS.